United States Patent [19]
Mattila

[11] 3,927,578
[45] Dec. 23, 1975

[54] E-Z REMOVABLE BELT GUARD HINGE
[76] Inventor: I. W. Mattila, 1361 Azalea Ave., McKinleyville, Calif. 95521
[22] Filed: May 2, 1974
[21] Appl. No.: 466,398

[52] U.S. Cl. .................................. 74/608; 74/611
[51] Int. Cl.² ............................................ F16P 1/02
[58] Field of Search ....................... 74/611, 609, 608

[56] References Cited
UNITED STATES PATENTS

| | | | |
|---|---|---|---|
| 1,279,711 | 9/1918 | Knight | 74/609 |
| 1,960,693 | 5/1934 | Bryant | 74/611 |
| 1,971,311 | 8/1934 | Chapman | 74/611 |
| D985,481 | 2/1911 | Webster | 74/609 |

Primary Examiner—Samuel Scott
Assistant Examiner—F. D. Shoemaker
Attorney, Agent, or Firm—Thomas H. Olson

[57] ABSTRACT

A housing for enclosing an endless belt and the pulleys around which the belt runs, the housing consisting of two half sections for being brought together around opposite sides of the belt and pulleys and the half sections then being held together by pins at each ends so to allow either end of the half sections to be separated so to inspect the machinery, or wherein either half section or both half sections can be completely removed.

1 Claim, 3 Drawing Figures

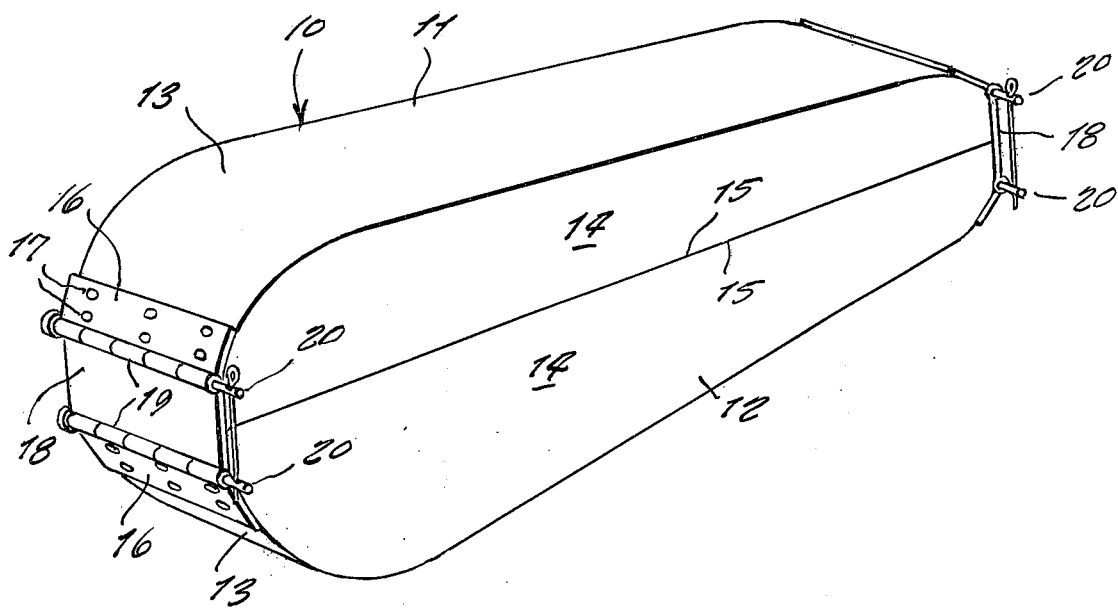
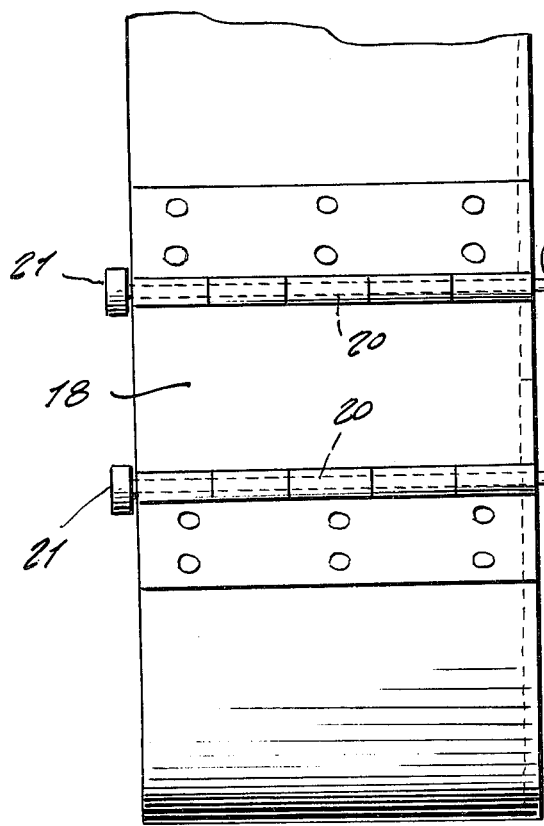
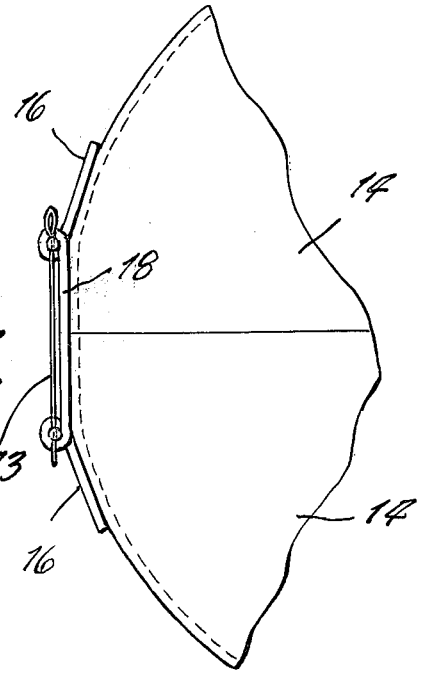

E-Z REMOVABLE BELT GUARD HINGE

This invention relates generally to casings for driving chains or driving belts.

A principal object of the present invention is to provide an improved guard for enclosing a driving belt and pulleys, and which is designed so that maintenance men can readily open up the guard in either of several different ways in order to inspect the machinery.

Another object of the present invention is to provide a belt guard comprising a housing made up of a pair of half sections which at their opposite ends are secured together by means of pairs of hinges each one of which includes a hinge pin that is removable.

Still another object of the present invention is to provide an E-Z removable belt guard hinge wherein a maintenance man can remove a pin at either end of an upper half of the guard section so to expose the belts and pulleys for inspection.

Still another object of the present invention is to provide an E-Z removable belt guard hinge wherein if necessary, the pin on an opposite end of the guard upper half section can be also removed so that the upper half section can be completely lifted off for a greater inspection.

Still another object of the present invention is to provide an E-Z removable belt guard hinge wherein if necessary for a thorough inspection, the pins on both ends of the lower half section can be removed so that the lower section is also removed thereby completely exposing the belts and pulleys.

Other objects of the present invention are to provide an E-Z removable belt guard hinge construction which is simple in design, inexpensive to manufacture, rugged in construction, easy to use and efficient in operation.

These and other objects will be readily evident upon a study of the following specification and the accompanying drawing, wherein:

FIG. 1 is a perspective view of the present invention;

FIG. 2 is an enlarged end view thereof;

FIG. 3 is a fragmentary side view thereof.

Referring now to the drawing in detail, the reference numeral 10 represents a guard according to the present invention for enclosing either endless belts and pulleys around which the belts run or else endless chains and sprockets around which they run, the guard comprising a housing for completely enclosing the same. This housing consists of an upper section 11 and lower section 12 each of which is a half section for being brought around opposite sides of the machinery and enclosing the same.

Each half section includes an outer peripheral wall 13 and a side wall 14 either on one or both sides. Thus together they form half shells such that when brought together they completely enclose the machinery belts and pulleys so that a person is safe from contact there with, and wherein the machinery itself is protected from being damaged by external objects contacting it.

The longitudinal side edges 15 of side walls 14 abut against each other so to completely enclose the side, while each of the peripheral walls 13 is shorter and has a hinge plate 16 secured thereto by means of screws, bolts or the like as shown at 17. An end wall 18 is made of strong, heavy metal plate equivalent of hinge plates 16. The opposite upper and lower edges of the end wall plate are rolled over as shown at 19 so to interfit or coact with the rolled over edges of the hinge plates 16 and in order to receive hinge pins 20 which thus secure the hinge plates 16 to the end wall plates 18.

Each of the hinge pins 20 is longer than the hinge plates 16 and end wall plate 18, one end of each hinge pin 20 having an enlarged head 21, and the opposite end of the hinge pins each having a transverse opening 22 there through so that a cotter pin or keeper pin 23 can be fitted through both, as shown in the drawing, and prevent the hinge pins from accidentally slipping out.

The guard 10 thus made can be mounted to any supporting structure of a machine by means of suitable brackets or the equivalent being bolted to the face of the end wall plates 18. Thus the guard is securely mounted for operative use.

In operative use, the guard 10 permits a maintenance man to remove the hinge pin 20 on either end of the upper half section 11 so to expose the belts and pulleys for inspection. If necessary, the pin on the opposite end of the guard can be likewise removed and the complete upper half section of the guard can be lifted off for a more thorough inspection. If it becomes necessary to completely remove the guard, then the pins 20 on both ends of the lower half section may be removed, leaving the lower half section free to be also removed and expose the belts and pulleys entirely.

Thus an E-Z removable belt guard hinge has been provided.

While various changes may be made in the detailed construction, it is understood that such changes will be within the spirit and scope of the present invention as is defined by the appended claim.

What I now claim is:

1. A removable belt guard for enclosing endless belts or chains running around pulleys or sprockets in a machine, said guard comprising a pair of half sections, one of said sections constituting an upper section and the other a lower section, each one of said half sections including a peripheral wall, a side wall on at least one side of said peripheral wall, and a hinge plate secured to each opposite end of said peripheral wall, at least one end wall plate configured for coaction with said hinge plates, pins means for releasably securing said hinge plates to said wall plate, the edges of said side walls of said two half sections abutting each other when said guard is assembled, said wall plate affording mounting of said guard to the machine.

* * * * *